United States Patent
Droste et al.

(10) Patent No.: US 9,705,992 B2
(45) Date of Patent: Jul. 11, 2017

(54) REMOTE TELEMATICS UNIT BAND CONTROL WITH DYNAMIC MEMORY

(71) Applicant: General Motors LLC, Detroit, MI (US)

(72) Inventors: Scott T. Droste, Ferndale, MI (US); David George, Farmington Hills, MI (US); Sitaram Emani, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 142 days.

(21) Appl. No.: 14/534,823

(22) Filed: Nov. 6, 2014

(65) Prior Publication Data

US 2016/0135039 A1 May 12, 2016

(51) Int. Cl.
*H04L 29/08* (2006.01)
*H04W 36/36* (2009.01)
*H04W 8/20* (2009.01)
*H04W 36/32* (2009.01)
*H04W 48/18* (2009.01)
*H04W 76/02* (2009.01)
*H04W 4/04* (2009.01)

(52) U.S. Cl.
CPC ............ *H04L 67/125* (2013.01); *H04L 67/12* (2013.01); *H04L 67/18* (2013.01); *H04W 8/205* (2013.01); *H04W 36/36* (2013.01); *H04W 4/046* (2013.01); *H04W 36/32* (2013.01); *H04W 48/18* (2013.01); *H04W 76/027* (2013.01)

(58) Field of Classification Search
None
See application file for complete search history.

(56) References Cited

U.S. PATENT DOCUMENTS

2008/0153486 A1* 6/2008 Ramkull ............... H04W 48/18
 455/434
2010/0167737 A1* 7/2010 Madhavan ............ H04W 48/20
 455/435.2

* cited by examiner

*Primary Examiner* — Olumide T Ajibade Akonai
*Assistant Examiner* — Margaret G Mastrodonato
(74) *Attorney, Agent, or Firm* — Christopher DeVries; Reising Ethington P.C.

(57) ABSTRACT

A system and method of remotely changing use of a cellular protocol at a vehicle includes: storing, in a network access device (NAD) at the vehicle, identities of one or more cellular bands that provide cellular service according to an up-to-date cellular protocol; wirelessly receiving at the vehicle a computer-readable instruction that deactivates the up-to-date cellular protocol; and in response to the computer-readable instruction, the vehicle: obtains the identities of the cellular bands stored in the NAD; stores the obtained identities in a non-volatile memory device located apart from the NAD; and erases in the NAD the identities of the cellular bands that provide cellular service according to an up-to-date cellular protocol.

10 Claims, 3 Drawing Sheets

US 9,705,992 B2

REMOTE TELEMATICS UNIT BAND CONTROL WITH DYNAMIC MEMORY

TECHNICAL FIELD

The present invention relates to the use of cellular telephony at a vehicle and, more specifically, the remote activation and deactivation of a cellular band used by a vehicle telematics unit.

BACKGROUND

Vehicle manufacturers assemble vehicles that use telematics units and cellular telephony to wirelessly communicate voice conversations and data to locations away from the vehicle. These vehicles and vehicle telematics units may be uniformly assembled at a central location and then delivered to locations all over the world. When vehicles arrive at their destination after assembly, the vehicles are likely to be optimized to operate using the most up-to-date cellular protocols in use at the time of vehicle assembly. Up-to-date cellular protocols can help the vehicle telematics unit provide the fastest data transfer speeds and the lowest latency during the delivery of services.

However, each delivery location may use a different cellular telephony provider that implements a cellular protocol having various levels of sophistication. The vehicle may be delivered to a location where the cellular provider uses a cellular protocol that is less sophisticated or up-to-date relative to what the vehicle telematics unit is optimized to use. In that case, the vehicle telematics unit of the vehicle may attempt to use the most up-to-date cellular protocol by default despite an inability of the local cellular provider to provide cellular service using the most up-to-date cellular protocol. As part of attempting to use the most current or up-to-date cellular protocol as a default choice, the vehicle telematics unit may suffer delays when communicating voice/data. These delays may result from high levels of latency as the unit attempts to first establish service using the default up-to-date cellular protocol before successfully establishing service using the less sophisticated cellular protocol offered by the local cellular telephony provider.

SUMMARY

According to an embodiment, there is provided a method of remotely changing use of a cellular protocol at a vehicle. The method includes storing, in a network access device (NAD) at the vehicle, identities of one or more cellular bands that provide cellular service according to an up-to-date cellular protocol; wirelessly receiving at the vehicle a computer-readable instruction that deactivates the up-to-date cellular protocol; and in response to the computer-readable instruction, the vehicle: obtains the identities of the cellular bands stored in the NAD; stores the obtained identities in a non-volatile memory device located apart from the NAD; and erases in the NAD the identities of the cellular bands that provide cellular service according to an up-to-date cellular protocol.

According to another embodiment, there is provided a method of remotely changing use of a cellular protocol at a vehicle. The method includes accessing from a network access device (NAD) located at the vehicle identities of one or more cellular bands that provide cellular service according to an up-to-date cellular protocol; storing the identities of one or more cellular bands that provide cellular service according to the up-to-date cellular protocol at the vehicle in a non-volatile memory device located apart from the NAD; deleting from the NAD the identities of the cellular bands that provide cellular service according to the up-to-date cellular protocol; wirelessly receiving at the vehicle a computer-readable instruction that activates use of the up-to-date cellular protocol; obtaining the identities of the cellular bands used to provide cellular service according to the up-to-date cellular protocol from the non-volatile memory device; and storing the obtained identities of the cellular bands used to provide cellular service according to the up-to-date cellular protocol in the NAD.

BRIEF DESCRIPTION OF THE DRAWINGS

One or more embodiments will hereinafter be described in conjunction with the appended drawings, wherein like designations denote like elements, and wherein.

DETAILED DESCRIPTION OF THE ILLUSTRATED EMBODIMENT(S)

Figure 1:
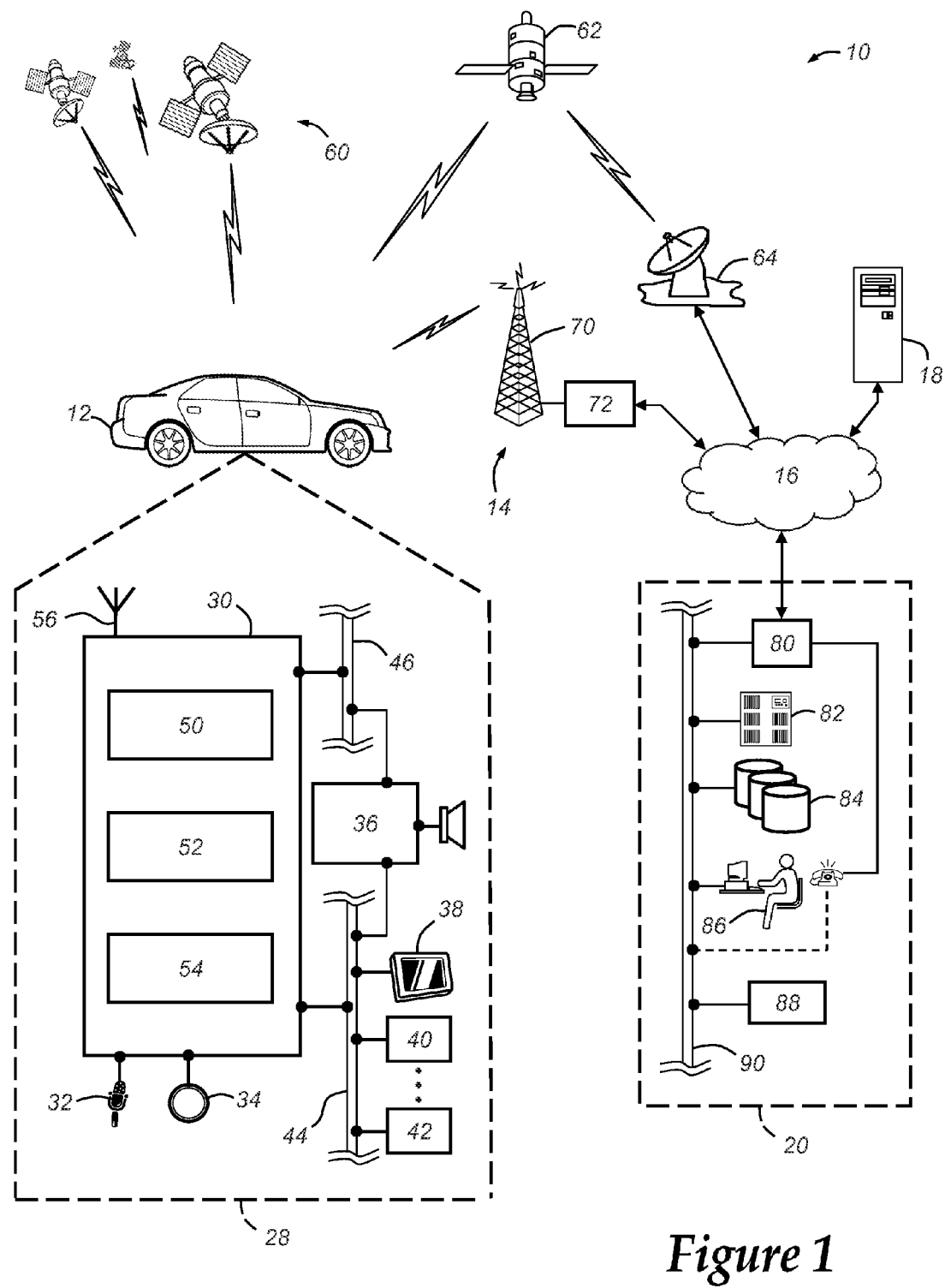
FIG. 1 is a block diagram depicting an embodiment of a communications system that is capable of utilizing the method disclosed herein.

The system and method described below remotely changes the cellular frequency band used by a network access device (NAD) and a vehicle telematics unit using the NAD after the NAD has been provisioned for use with a cellular telephony provider local to the area in which the vehicle operates. The vehicle telematics unit and its NAD may be optimized to operate with a cellular telephony provider that uses the most up-to-date cellular protocol. But when delivered to one of the various locations where the vehicle will operate, the vehicle may be provisioned by a cellular telephony provider that does not efficiently provide service via the up-to-date cellular protocol or offers a less-sophisticated cellular protocol.

One example of an up-to-date cellular protocol is the 4G long term evolution (LTE) protocol presently used by cellular telephony providers. In some geographical locations, the 4G LTE cellular protocol may not have been implemented or is not implemented consistently enough or with sufficient quality that the NAD of the vehicle telematics unit operates efficiently. When an up-to-date cellular standard such as 4G LTE is either not used by the cellular telephony provider or the performance standards defined by the cellular protocol are not consistently met, the NAD and vehicle telematics unit may search for less sophisticated cellular protocols, such as 3G UMTS. The effort expended by the NAD and vehicle telematics unit to establish service with an up-to-date cellular protocol can increase latency in response to service requests that involve cellular telephony. When the vehicle or a remote facility determines that the up-to-date cellular protocol is not operating properly or is not provided, the vehicle telematics unit can be instructed to prevent access to that protocol. And if it is later determined that the up-to-date cellular protocol becomes available from the cellular telephony provider or operates properly, the vehicle telematics unit can then be instructed to use it.

The vehicle telematics unit can control the cellular bands used by the NAD by erasing and/or writing the identities of cellular bands used to implement up-to-date cellular protocols in the NAD. Once a vehicle is delivered to a particular location, the NAD used by the vehicle telematics unit can provision itself with information from the cellular telephony provider in that location. The information includes the identities of cellular bands that can be used by the NAD to establish service using the up-to-date cellular protocol. The vehicle telematics unit can determine that the NAD is not operating optimally or receive an instruction from a remote facility to deactivate the use of the up-to-date cellular protocol. After making that determination or receiving the instruction, the vehicle telematics unit can access the identities of at least some of the cellular bands used by the NAD and store those identities apart from the NAD. The vehicle telematics unit can then erase the identities of the cellular bands used to access the up-to-date cellular protocol. The NAD can then automatically access the less sophisticated cellular protocol by default. It is also possible to begin using the up-to-date cellular protocol at the NAD again. To do so, the vehicle telematics unit can receive an instruction to begin using the up-to-date cellular protocol and access the previously-stored identities of cellular bands stored apart from the NAD. The vehicle telematics unit can then access the NAD and write the identities of the cellular bands used to access up-to-date cellular protocols back into the NAD. The NAD can then return to using cellular service according to up-to-date cellular protocols.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA cellular protocols governed by the 3rd Generation Partnership Project (3GPP) and the 3rd Generation Partnership Project 2 (3GPP2) as well as the cellular protocols for the 4G long term evolution (LTE) standards defined by the International Telecommunications Union-Radio communications sector (ITU-R). The vehicle telematics unit 30 can include a network access device (NAD) or baseband processor that can also be referred to as a standard cellular chipset 50 for voice communications and wireless data transmission, an electronic processing device 52, one or more digital memory devices 54, and a dual antenna 56. It should be appreciated that the modem can be implemented either through software that is stored in the telematics unit and is executed by processor 52, or it can be a separate hardware component located internal or external to telematics unit 30. The modem as well as the cellular chipset 50 can operate using any number of different standards or protocols such as EDGE, EVDO, CDMA, GPRS, UMTS, and HSPA+ to name a few as well as newer 4G LTE cellular protocols that include LTE Advanced as set forth by the 3GPP. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology or cellular protocols as are discussed above. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
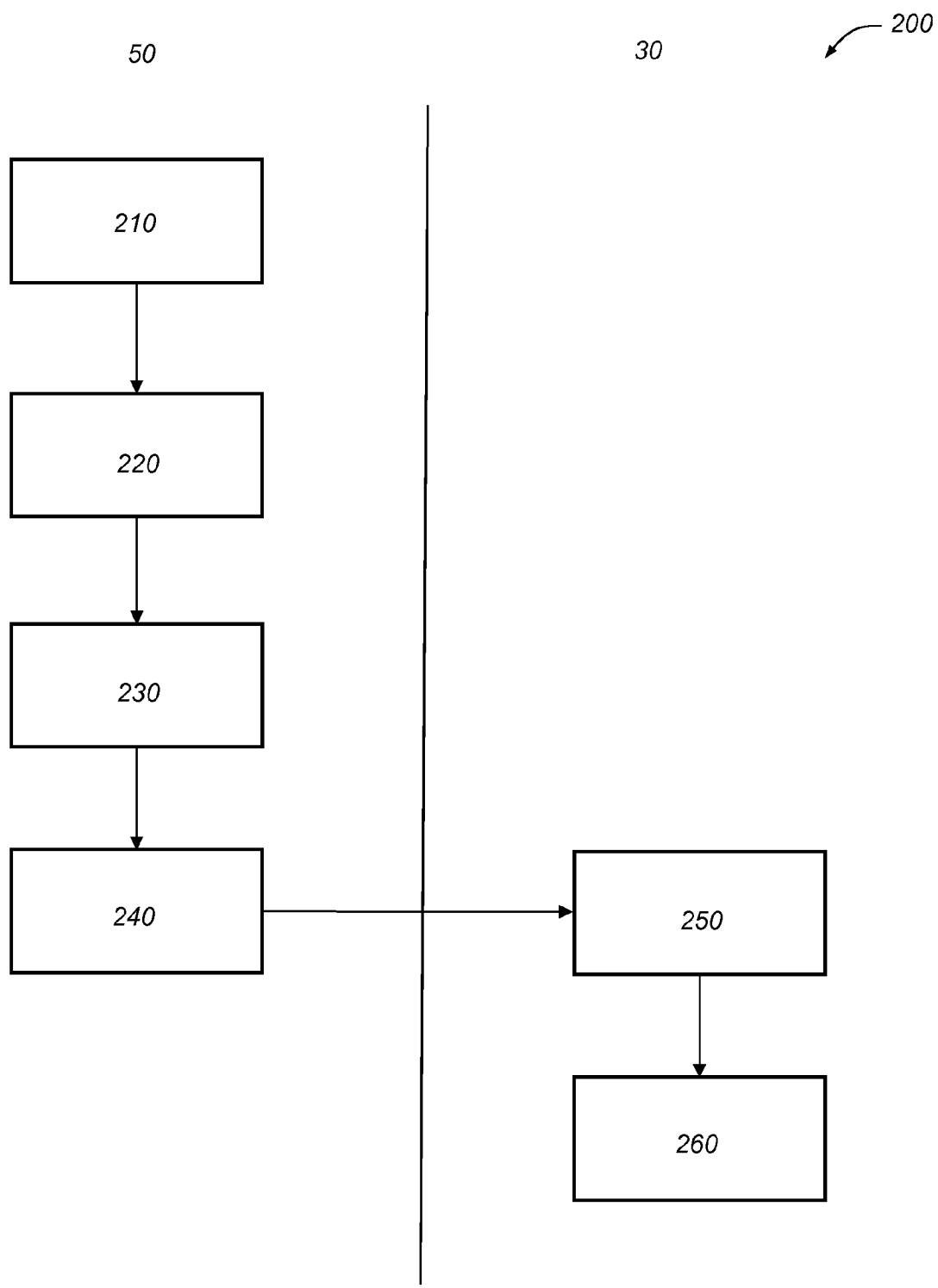
FIG. 2 is a flow chart depicting an embodiment of a method of accessing the identities of cellular bands stored at a network access device (NAD) from a vehicle telematics unit.

FIG. 2 depicts a method 200 of storing in a network access device (NAD) at the vehicle 12 the identities of one or more cellular bands that provide cellular service according to an up-to-date cellular protocol. The method 200 begins at step 210 by receiving an instruction to reset the NAD or to power the NAD to an active state. The following description will describe the NAD in terms of the cellular chipset 50 described above. The cellular chipset 50 can then read its unique cellular identifier, such as a station identifier (STID), an integrated circuit card identifier (ICCID), an international subscriber mobile identifier (IMSI) as part of step 210 and then access provisioning files associated with a home service provider based on the unique cellular identifier at step 220. For instance, the cellular chipset 50 can determine if the unique cellular identifier will be used with a cellular telephony provider identified in a universal integrated circuit card (UICC) or subscriber identity module (SIM) card at the cellular chipset 50.

When a cellular telephony provider in the UICC or SIM has been selected, data files used to provision the cellular chipset 50 for service with the cellular telephony provider can be accessed from non-volatile memory at the cellular chipset 50 at step 230. A variety of information is included with the data files, such as preferred roaming lists, as well as the identity of cellular bands used with an up-to-date protocol. In the described embodiments, the up-to-date protocol will be referred to as a 4G LTE protocol while the less sophisticated protocol will be described with respect to a 3G UMTS protocol. However, it should be appreciated that other cellular protocols could be used with this system and method. Generally speaking, a less-sophisticated cellular protocol can be distinguished from a more-sophisticated or up-to-date cellular protocol by having a usage or release date that precedes the more-sophisticated cellular protocol. The data files accessed as part of provisioning the cellular chipset 50 can identify the cellular bands used with 4G LTE and with 3G UMTS. In one example, the cellular chipset 50 can access the data files as part of provisioning and determine that 4G LTE is associated with cellular bands at 1900 MHz, 2300 MHz, and 2600 MHz while the 3G cellular bands to be accessed for service are at 900 MHz and 1800 MHz. As part of provisioning, the cellular chipset 50 can store the identities of these cellular bands in non-volatile memory at the chipset 50 at step 240 and associate their use with particular cellular protocols, in this case 4G LTE and 3G. When the cellular chipset 50 sends or receives data, depending on which cellular protocol it attempts to use, it can choose the appropriate cellular band for that protocol.

After the cellular chipset 50 has provisioned itself with the identity of cellular bands for a particular cellular telephony provider, the vehicle telematics unit 30 can access the identities of the cellular bands stored at the cellular chipset 50 at step 250. The vehicle telematics unit 30 can read the non-volatile memory where the cellular bands have been stored and determine the identities of those cellular bands. For this purpose, the chipset 50 can be designed to enable access by telematics unit 30 to this stored information, or to provide an interface by which it can access this information and provide it to the telematics unit 30 upon request. The hardware and software necessary to include this capability in the chipset 50 will be apparent to those skilled in the art. Once retrieved, the identities of the cellular bands can then be compared with cellular frequencies belonging to 4G LTE service to determine if the cellular chipset 50 has been provisioned for access to up-to-date cellular protocols as part of step 250. If the chipset 50 has not been provisioned for 4G LTE service, the method 200 ends. Otherwise, the method 200 proceeds to step 260 where the vehicle telematics unit 30 stores the identities of the cellular bands for 4G LTE access in memory device 54 and the method 200 ends.

Figure 3:
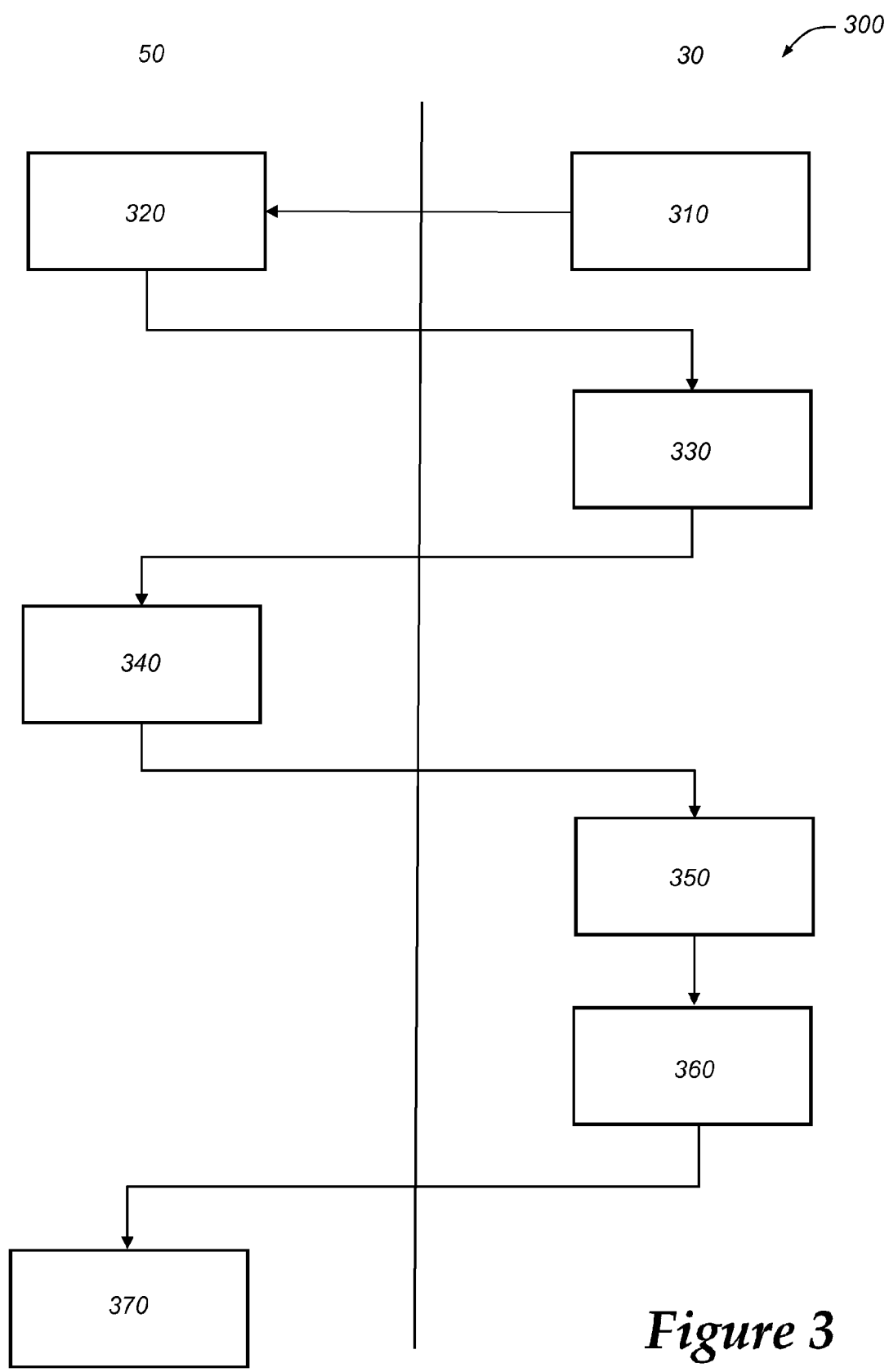
FIG. 3 is a flow chart depicting an embodiment of method of remotely changing use of a cellular protocol at a vehicle.

Turning now to FIG. 3, there is shown a method 300 of remotely changing use of a cellular protocol at the vehicle 12 shown in FIG. 1. The method 300 begins at step 310 by wirelessly receiving at the vehicle 12 a computer-readable instruction that deactivates the ability of the cellular chipset 50 to use the up-to-date cellular protocol (in this case 4G LTE). A central facility, such as the computer 18 or call center 20, can determine that the cellular chipset 50 or the vehicle telematics unit 30 using the cellular chipset 50 is not performing optimally. Such a determination can be made by measuring one or more wireless performance variables at the vehicle 12, such as latency or failed calls using the 4G LTE protocol, and then wirelessly transmitting an indication that these variables are below established standards to the central facility. These performance variables and the level of acceptable performance are defined by the cellular protocols themselves and are understood to those skilled in the art. The central facility can then construct a wireless message that contains a computer-readable instruction for the cellular chipset 50 to stop using 4G LTE. The central facility can identify the vehicle telematics unit 30 by its unique identifier, which can include a mobile dialed number (MDN), and transmit the computer-readable instruction to the vehicle telematics unit 30.

The computer-readable instruction can be constructed using a variety of techniques. In one example, the computer-readable instruction can be included in a short message service (SMS) message and sent to the vehicle telematics unit 30. Or in another example, the computer-readable instruction can be communicated to the vehicle telematics unit 30 through a data connection established between the vehicle 12 and the central facility. The data connection can be a circuit-switched call (e.g., a voice call) or can be a dedicated data connection between the vehicle 12 and the central facility.

In response to the computer-readable instruction, the vehicle telematics unit 30 obtains the identities of the cellular bands stored in the cellular chipset 50 at step 320. The vehicle telematics unit 30 can access the cellular chipset 50 to obtain the identities of the cellular bands stored in the cellular chipset 50 and store the obtained identities in a non-volatile memory device located apart from the chipset 50 (if it has not done so) at step 330. After ensuring that the identities of the cellular bands associated with 4G LTE service are stored in a location apart from the cellular chipset 50, the vehicle telematics unit 30 can erase the identities of the cellular bands that provide cellular service according to the 4G LTE cellular protocol from the chipset 50 and then replace the identities of the 4G LTE cellular bands with null values during step 340. The hardware and software features of the telematics unit 30 and chipset 50 will be apparent to those skilled in the art. The cellular chipset 50 will then not be able to access the cellular telephony provider using the 4G LTE protocol and may then default to using 3G UMTS instead. The method 300 proceeds to step 350.

At step 350, the vehicle telematics unit 30 can wirelessly receive another computer-readable instruction to activate use of the 4G LTE cellular protocol at the vehicle telematics unit 30. The computer-readable instruction activating the 4G LTE cellular protocol can be constructed as described above with respect to the instruction deactivating service. After receiving the computer-readable instruction, the vehicle telematics unit 30 can access the memory device 54 where the identities of the 4G LTE cellular bands are stored at step 360. The vehicle telematics unit 30 can use the identities of the 4G LTE bands to write them in the memory portion of the cellular chipset 50 thereby replacing the null values at step 370. Once the identities of the 4G LTE bands are stored in the cellular chipset 50, the chipset 50 can begin using 4G LTE service provided by the cellular telephony provider. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of remotely changing use of a cellular protocol at a vehicle, comprising the steps of:
   (a) storing, in a network access device (NAD) at the vehicle, identities of one or more cellular bands that provide cellular service according to an up-to-date cellular protocol and a less sophisticated cellular protocol;
   (b) wirelessly receiving at the vehicle a computer-readable instruction that deactivates the up-to-date cellular protocol; and
   (c) in response to the computer-readable instruction, the vehicle:
      (c1) obtains the identities of the cellular bands stored in the NAD;
      (c2) stores the obtained identities in a non-volatile memory device located apart from the NAD; and
      (c3) erases in the NAD the identities of the cellular bands that provide cellular service according to an up-to-date cellular protocol;
   (d) wirelessly communicating via the NAD using the less sophisticated cellular protocol.

2. The method of claim 1, wherein the cellular bands represent radio frequencies used by 4G long term evolution (LTE) cellular protocols.

3. The method of claim 1, wherein the less sophisticated cellular protocol further comprises a 3G universal mobile telecommunication system (UMTS) cellular protocol.

4. The method of claim 1, further comprising the step of accessing the identities of the cellular bands from data files in a universal integrated circuit card (UICC) or subscriber identity module (SIM) card in the NAD.

5. The method of claim 1, further comprising the step of determining that the up-to-date cellular protocol is not used by the cellular telephony provider or that performance standards defined by the up-to-date cellular protocol are not consistently met by the cellular telephony provider.

6. A method of remotely changing use of a cellular protocol at a vehicle, comprising the steps of:
   (a) accessing from a network access device (NAD) located at the vehicle identities of one or more cellular bands that provide cellular service according to an up-to-date cellular protocol or a less sophisticated cellular protocol;
   (b) storing the identities of one or more cellular bands that provide cellular service according to the up-to-date cellular protocol and the less sophisticated protocol at the vehicle in a non-volatile memory device located apart from the NAD;
   (c) deleting from the NAD the identities of the cellular bands that provide cellular service according to the up-to-date cellular protocol;
   (d) wirelessly communicating via the NAD using the less sophisticated cellular protocol;
   (e) wirelessly receiving at the vehicle a computer-readable instruction that activates use of the up-to-date cellular protocol;
   (f) obtaining the identities of the cellular bands used to provide cellular service according to the up-to-date cellular protocol from the non-volatile memory device; and
   (g) storing the obtained identities of the cellular bands used to provide cellular service according to the up-to-date cellular protocol in the NAD.

7. The method of claim 6, wherein the cellular bands represent radio frequencies used by 4G long term evolution (LTE) cellular protocols.

8. The method of claim 6, wherein the less sophisticated cellular protocol further comprises a 3G universal mobile telecommunication system (UMTS) cellular protocol.

9. The method of claim 6, further comprising the step of accessing the identities of the cellular bands that provide cellular service according to an up-to-date cellular protocol from data files in a universal integrated circuit card (UICC) or subscriber identity module (SIM) card in the NAD.

10. The method of claim 6, further comprising the step determining that the up-to-date cellular protocol is not used by the cellular telephony provider or performance standards defined by the up-to-date cellular protocol are not consistently met by the cellular telephony provider.

\* \* \* \* \*